3,631,109
β,β'-BIS[DIALKYLAMINOMETHYL-4-HYDROXY-
BENZYLTHIO]DIALKYLETHERS
Francis X. O'Shea, Naugatuck, Conn., assignor to
Uniroyal, Inc., New York, N.Y.
No Drawing. Filed Dec. 4, 1968, Ser. No. 781,247
Int. Cl. C07c 87/28
U.S. Cl. 260—570.9                                    3 Claims

ABSTRACT OF THE DISCLOSURE

This invention is concerned with a new series of compounds found to be useful as antioxidants, and their method of production. The compounds described as bis-phenolic antioxidants are particularly effective for retarding oxidative deterioration in rubber, plastics, fats and petroleum products.

---

The compounds of this invention are represented by the formula:

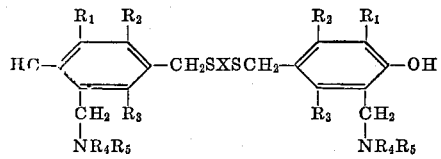

wherein $R_1$ may be an alkyl group of up to twelve carbon atoms, a cycloalkyl group of five to eight carbon atoms or an aralkyl group of seven to nine carbon atoms, $R_2$ and $R_3$ may be hydrogen or methyl, $R_4$ and $R_5$ may be alkyl groups of up to five carbon atoms each and X is a diradical containing from two to about fourteen carbon atoms and is aliphatic diradicals containing hetero atoms of the general formula:

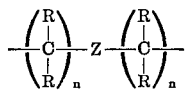

wherein the R groups may be hydrogen or alkyl groups, $n$ is a whole number from 1 to 6 and Z is selected from the group consisting of —O—, —S—, —$SO_2$— and —NR'— (wherein R' is an alkyl group), for example:

—$CH_2CH_2OCH_2CH_2$— and —$CH_2CH_2SCH_2CH_2$—

This invention is concerned with a new series of compounds found to be useful as antioxidants, and their method of production. The compounds described as bis-phenolic antioxidants are particularly effective for retarding oxidative deterioration in rubber, plastics, fats and petroleum products.

The compounds of this invention are represented by the formula:

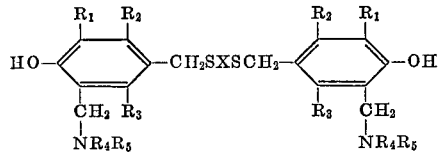

wherein $R_1$ may be an alkyl group of up to twelve carbon atoms, a cycloalkyl group of five to eight carbon atoms or an aralkyl group of seven to nine carbon atoms, $R_2$ and $R_3$ may be hydrogen or methyl, $R_4$ and $R_5$ may be alkyl groups of up to five carbon atoms each and X is a diradical containing from two to about fourteen carbon atoms and is selected from the group consisting of:

(a) polymethylene diradicals of the formula —$(CH_2)_n$— wherein $n$ is a whole number from 2 to 14, for example —$CH_2CH_2$— and —$(CH_2)_{14}$—.

(b) Branched chain polyalkylene diradicals of the formula:

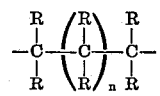

wherein $n$ is a whole number from 0 to 11 and the R groups may be hydrogen or alkyl groups and at least one of the R groups is an alkyl group, for example —$CH_2$—$CH(CH_3)$— and —$CH_2$—$CH(CH_3)$—$CH_2$—

(c) Aralkyl diradicals of the formula:

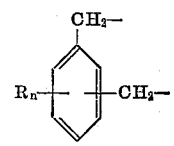

wherein R is an alkyl group and $n$ is a whole number from 0 to 4, for example

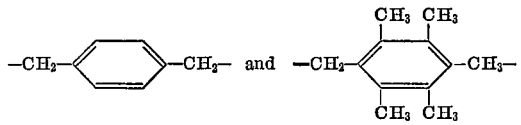

(d) aralkyl diradicals of the formulae:

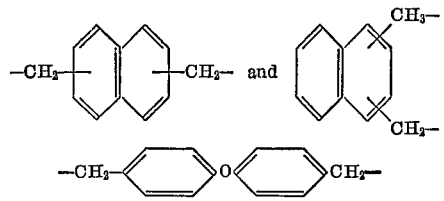

(e) aromatic diradicals of the formula:

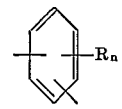

wherein R is an alkyl radical and $n$ is a whole number from 0 to 4, for example

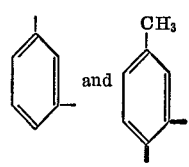

(f) aromatic diradicals of the formula:

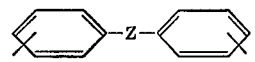

wherein Z is selected from the group consisting of —O—, —S— and —SO₂—.

(g) an aromatic diradical of the formula:

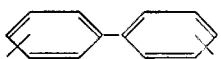

(h) cyclic hydrocarbon containing diradicals of the general formula:

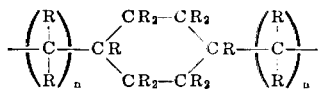

wherein the R groups may be hydrogen or alkyl groups and $n$ is a whole number from 0 to 6, for example:

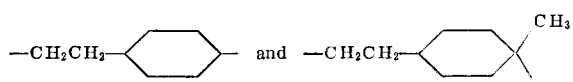

(i) aliphatic diradicals containing hetero atoms of the general formula:

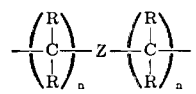

wherein the R groups may be hydrogen or alkyl groups, $n$ is a whole number from 1 to 6 and Z is selected from the group consisting of —O—, —S—, —SO₂— and —NR'— (wherein R' is an alkyl group), for example:

—CH₂CH₂OCH₂CH₂— and —CH₂CH₂SCH₂CH₂—

(j) diradicals of the formulae:

—CH₂CH₂OCH₂CH₂OCH₂CH₂— and
—CH₂CH₂OCH₂OCH₂CH₂—

The compounds of my invention may be prepared by reacting the following compound of the general formula:

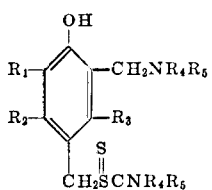

wherein $R_1$, $R_2$, $R_3$, $R_4$ and $R_5$ are as previously described with an alkali metal hydroxide and a dimercaptan of the formula:

HS—X—SH wherein —X— is as previously described according to the following equation:

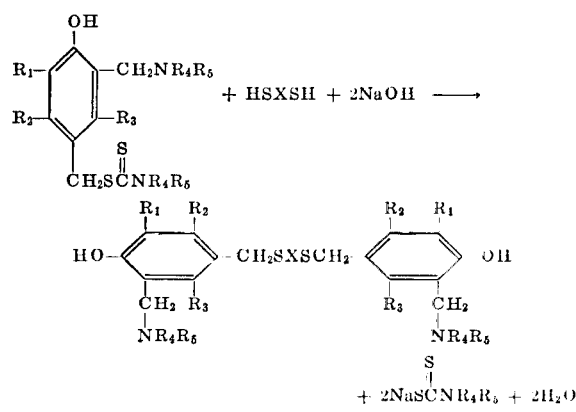

The compounds of my invention may be prepared by treating two molar equivalents of a compound of the general formula:

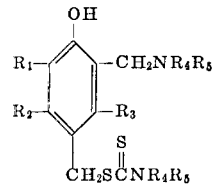

wherein $R_1$, $R_2$, $R_3$, $R_4$ and $R_5$ are as previously described with two molar equivalents of an alkali metal hydroxide and one molar equivalent of a dimercaptan of the formula: HS—X—SH.

The reaction may be carried out in a suitable water miscible solvent such as methanol, ethanol, isopropanol, dioxane, ethylene glycol dimethyl ether, etc. at a temperature from about room temperature to about 100° C.

Preferred solvents for the reaction are methanol, ethanol and isopropanol, while the preferred temperature is in the range of 50° C. to 100° C., the reaction ordinarily being carried out at or near the reflux temperature of the solution. The preferred time of the reaction is up to four hours, although longer times may be used but are not necessary, the reaction generally being complete in 30 minutes or less.

The reaction may also be carried out in a two-phase system such as benzene-water, xylene-water, etc. using vigorous agitation. Although longer reaction times are generally employed than with a homogeneous solution, this heterogeneous system has the advantage of providing a simplified recovery procedure. In such a two-phase system, the product is soluble in the organic phase which can be readily separated from the aqueous phase containing the alkali metal dialkyldithiocarbamate. The product is then obtained by removing the solvent from the organic phase.

The intermediate hydroxybenzyl dithiocarbamates are prepared by reacting one molar equivalent of a phenolic compound of the general formula:

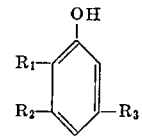

wherein $R_1$, $R_2$ and $R_3$ are as previously described with at least two molar equivalents of formaldehyde, two molar equivalents of an amine of the formula:

R₄R₅NH in which $R_4$ and $R_5$ are as previously described and one molar equivalent of carbon disulfide. This procedure is described in my U.S. Pat. No. 3,381,026, issued Apr. 30, 1968.

The hydrocarbon substituted phenols which may be used include o-cresol, o-ethylphenol,
o-isopropylphenol, o-sec-butylphenol,
o-t-butylphenol, o-t-amylphenol,
o-(α-methylpentyl)phenol,
o-(α-methylheptyl)phenol,
o-(α-methylundecyl)phenol,
o-cyclohexylphenol,
o-benzylphenol,
o-cyclooctylphenol,
o-(α-methylbenzyl)phenol,
o-(α,α-dimethylbenzyl)phenol,
2,3-dimethylphenol,
2,5-dimethylphenol,
2,3,5-trimethylphenol,
6-isopropyl-m-cresol, 2-isopropyl-3,5-dimethylphenol,
6-t-butyl-m-cresol,
2-t-butyl-3,5-dimethylphenol,
6-sec-butyl-m-cresol,
2-sec.-butyl-3,5-dimethylphenol,
6-(α-methylpentyl)-m-cresol,
2-(α-methylpentyl)-3,5-dimethylphenol,
6-t-amyl-m-cresol,
2-t-amyl-3,5-dimethylphenol,
6-(α-methylheptyl)-m-cresol,
2-(α-methylheptyl)-3,5-dimethylphenol,
6-(α-methylnonyl)-m-cresol,
2-(α-methylnonyl)-3,5-dimethylphenol,
6-(α-methylundecyl)-m-cresol,
2-(α-methylundecyl)-3,5-dimethylphenol,
6-t-octyl-m-cresol,
2-t-octyl-3,5-dimethylphenol,
6-cyclohexyl-m-cresol,
2-cyclohexyl-3,5-dimethylphenol,
6-cyclooctyl-m-cresol,
2-cyclooctyl-3,5-dimethylphenol,
6-benzyl-m-cresol,
2-benzyl-3,5-dimethylphenol,
6-(α-methylbenzyl)-m-cresol,
2-(α-methylbenzyl)-3,5-dimethylphenol,
6-(α,α-dimethylbenzyl)-m-cresol and
2-(α,α-dimethylbenzyl)-3,5-dimethylphenol.

The preferred phenols are o-alkylphenols in which the alkyl group contains from one to four carbon atoms such as o-cresol and o-t-butylphenol.

The secondary amines which may be used include dimethylamine, methylethylamine, diethylamine, dibutylamine and diamylamine, however the preferred amine is dimethylamine.

The dimercaptans which may be used include 1,2-ethanedithiol, 1,10-decanedithiol, 2,2-dimethyl-1,3-propanedithiol, α,α'-dimercapto-p-xylene, bis(mercaptomethyl)naphthalene, toluenedithiol, bis(mercaptomethyl)diphenyl ether, p,p' - oxybis(thiophenol), dimercapto biphenyl, 2-mercapto-ethyl-4-mercaptocyclohexane, β,β'-dimercaptodiethyl ether, 1,2 - bis - (β - mercaptoethoxy) ethane and β,β'-dimercaptodiethyl sulfide.

To illustrate the novel bis-phenolic compounds and their methods of preparation, the following examples are given. It should be understood however, that these examples are merely illustrative and are not to be regarded as limitations to the appended claims since the basic teachings thereof may be varied at will, as will be understood by one skilled in the art. In the examples, the proportions are expressed in parts by weight unless otherwise noted.

EXAMPLE 1

The preparation of 1,2-bis[3-methyl-4-hydroxy-5-(dimethylaminomethyl)-benzylthio]ethane.

To a solution of 29.8 g. (0.1 mole) of 3-methyl-4-hydroxy-5-(dimethylaminomethyl)benzyl N,N - dimethyldithiocarbamate and 4.7 g. (0.05 mole) of ethanedithiol in 100 ml. of warm ethanol was added a solution of 16 g. (0.2 mole) of 50% sodium hydroxide in 20 ml. of water. The solution was heated near reflux for 15 minutes. It was then diluted with 50 ml. of water and cooled. The solid which precipitated was filtered off, washed with aqueous ethanol and dried. The yield of 1,2-bis[3-methyl-4-hydroxy - 5 - (dimethylaminomethyl)benzylthio]ethane was 13.8 g. (62%), M.P. 110–111° after recrystallization from ethanol.

*Analysis.*—Calc'd for $C_{24}H_{36}N_2O_2S_2$ (percent): C, 64.3; H, 8.04; N, 6.26; S, 14.3. Found (percent): C, 63.97; H, 8.04; N, 5.98; S, 14.47.

EXAMPLE 2

The preparation of α,α'-bis[3-t-butyl-4-hydroxy-5-(dimethylaminomethyl)benzylthio]-p-xylene.

3-t-butyl - 4 - hydroxy-5-(dimethylaminomethyl)benzyl N,N-dimethyldithiocarbamate was reacted with α,α'-dimercapto-p-xylene in the manner described in Example 1. α,α'-Bis[3-t-butyl-4-hydroxy-5-(dimethylaminomethyl) benzylthio]-p-xylene was obtained in 71% yield, M.P. 125–128° after recrystallization from ethanol.

*Analysis.*—Calc'd for $C_{36}H_{52}N_2O_2S_2$ (percent): C, 71.1; H, 8.61; N, 4.60; S, 10.50. Found (percent): C, 71.50; H, 8.65; N, 4.80; S, 10.26.

EXAMPLE 3

The preparation of α,α'-bis[3-cyclohexyl-4-hydroxy-5-(dimethylaminomethyl)benzylthio]-p-xylene.

3 - cyclohexyl - 4 - hydroxy-5-(dimethylaminomethyl) benzyl N,N-dimethyldithiocarbamate was reacted with α,α'-dimercapto-p-xylene in the manner described in Example 1. α,α'-Bis[3-cyclohexyl - 4 - hydroxy-5-(dimethylaminomethyl)benzylthio]-p-xylene was obtained in 75% yield, M.P. 125–126° after recrystallization from ethanol.

*Analysis.*—Calc'd for $C_{40}H_{56}N_2O_2S_2$ (percent): C, 72.7; H 8.5; N, 4.2; S, 9.7. Found (percent): C, 79.92; H, 8.68; N, 3.91; S, 9.83.

EXAMPLE 4

The preparation of 1,4-bis[3-cyclohexyl-4-hydroxy-5-(dimethylaminomethyl)benzylthio]butane.

3 - cyclohexyl - 4 - hydroxy-5-(dimethylaminomethyl) benzyl N,N-dimethyldithiocarbamate was reacted with 1,4-butanedithiol in the manner described in Example 1 to yield 1,4-bis[3-cyclohexyl-4-hydroxy-5-(dimethylaminomethyl)benzylthio]butane, M.P. 84–86° after recrystallization from hexane.

*Analysis.*—Calc'd for $C_{36}H_{56}O_2N_2S_2$ (percent): C, 70.6; H, 9.15; N, 4.57; S, 10.44. Found (percent): C, 70.78; H, 9.16; N, 4.73; S, 10.90.

EXAMPLE 5

The preparation of 1,2-bis[3-benzyl-4-hydroxy-5-(dimethylaminomethyl)benzylthio]ethane.

3-benzyl - 4 - hydroxy-5-(dimethylaminomethyl)benzyl N,N-dimethyldithiocarbamate was reacted with 1,2-ethanedithiol in the manner described in Example 1 to yield 1,2-bis[3 - benzyl - 4 - hydroxy-5-(dimethylaminomethyl)benzylthio]ethane, M.P. 114–116° after recrystallization from ethanol.

*Analysis.*—Calc'd for $C_{36}H_{44}N_2O_2S_2$ (percent): S, 10.68. Found (percent): S, 11.01.

EXAMPLE 6

The preparation of α,α'-bis[2,3-dimethyl-4-hydroxy-5-(dimethylaminomethyl)benzylthio]-p-xylene.

2,3 - dimethyl - 4 - hydroxy-5-(dimethylaminomethyl) benzyl N,N-dimethyldithiocarbamate was reacted with α,α'-dimercapto-p-xylene in the manner described in Example 1 to yield α,α'-bis[2,3-dimethyl-4-hydroxy-5-(dimethylaminomethyl)benzylthio]-p-xylene, M.P. 138–140°

*Analysis.*—Calc'd for $C_{32}H_{44}N_2O_2S_2$ (percent): S, 11.60. Found (percent): S, 11.77.

EXAMPLE 7

The preparation of β,β'-bis[2,5-dimethyl-3-(dimethylaminomethyl)-4-hydroxybenzylthio]diethyl ether.

2,5-dimethyl - 3 - (dimethylaminomethyl) - 4 - hydroxybenzyl N,N-dimethyldithiocarbamate was reacted with β,β'-dimercaptodiethyl ether in the manner described in Example 1 to yield β,β'-bis[2,5-dimethyl-3-(dimethylaminomethyl)-4-hydroxybenzylthio]diethyl ether as a viscous oil in quantitative yield.

EXAMPLE 8

The preparation of β,β' - bis[2,5 - dimethyl - 3 - (dimethylaminomethyl) - 4 - hydroxybenzylthio]diethyl sulfide.

2,5 - dimethyl - 3 - (dimethylaminomethyl) - 4 - hydroxybenzyl N,N-dimethyldithiocarbamate was reacted with β,β' - dimercaptodiethyl sulfide in the manner described in Example 1 to yield β,β'-bis[2,5 - dimethyl-3-

(dimethylaminomethyl) - 4 - hydroxybenzylthio]diethyl sulfide as a viscous oil in 95% yield.

EXAMPLE 9

The preparation of p,p'-bis[3 - methyl - 4 - hydroxy-5-(dimethylaminomethyl)benzylthiomethyl]diphenyl ether.

3 - methyl - 4 - hydroxy - 5 - (dimethylaminomethyl) benzyl N,N - dimethyldithiocarbamate was reacted with p,p'-bis(mercaptomethyl)diphenyl ether in the manner described in Example 1 to yield p,p'-bis[3 - methyl - 4 - hydroxy - 5 - (dimethylaminomethyl)benzylthiomethyl] diphenyl ether as a viscous oil in 86% yield.

EXAMPLE 10

The preparation of β - [3 - methyl - 4 - hydroxy - 5- (dimethylaminomethyl) - benzylthio]ethyl - 3(or 4)-[3-methyl - 4 - hydroxy - 5 - (dimethylaminomethyl)-benzylthio]cyclohexane.

3 - methyl - 4 - hydroxy - 5 - (dimethylaminomethyl) benzyl N,N - dimethyldithiocarbamate was reacted with β - mercaptoethyl - 3(or 4) - mercaptocyclohexane in the manner described in Example 1 to yield β-[3-methyl-4-hydroxy - 5 - (dimethylaminomethyl)benzylthio]ethyl-3(or 4) - [3 - methyl - 4 - hydroxy - 5 - (dimethylaminomethyl)benzylthio]cyclohexane as a viscous oil.

EXAMPLE 11

The preparation of p,p'-bis[3 - methyl - 4 - hydroxy-5-(dimethylaminomethyl)benzylthio]diphenyl ether.

3 - methyl - 4 - hydroxy - 5 - (dimethylaminomethyl) benzyl N,N - dimethyldithiocarbamate was reacted with p,p'-dimercaptodiphenyl ether in the manner described in Example 1 to yield p,p'-bis[3 - methyl - 4 - hydroxy-5-(dimethylaminomethyl)benzylthio]diphenyl ether as a viscous oil in 88.7% yield.

EXAMPLE 12

This example demonstrates the usefulness of the compounds of the invention as stabilizers for polyisoprene.

A commercial cis-polyisoprene synthetic rubber containing 2,6 - di-t-butyl-p-cresol as a stabilizer was used as the base polymer. The polymer was dissolved in benzene so as to provide a 2% polymer solution. An aliquot portion of a benzene solution of the compound to be evaluated was added so as to provide 1% by weight of the additive based upon the weight of polymer in the solution. A thin film of rubber was then deposited on a sodium chloride disk by evaporating 10 drops of the solution on the one inch diameter disk.

The disks were then placed in a 130° C. oven and removed after 30 minutes, one hour and every hour thereafter. At each interval, the infrared spectrum of the polymer film was obtained. Oxidation of the polymer film is evidenced by the appearance of a band at 5.85μ in the spectrum caused by the development of carbonyl groups in the polymer. The time of aging required for the appearance of this band in the spectrum is taken as the break time. The effectiveness of compounds as stabilizers can be evaluated by the length of time they protect the rubber against oxidation as determined by this carbonyl development test.

| Added stabilizer: | Hours to break |
|---|---|
| None | ½ |
| 1,2 - bis[3-t-butyl - 4 - hydroxy - 5 - (dimethylaminomethyl)benzylthio]ethane | 2 |
| β,β'-bis[3-t-butyl - 4 - hydroxy - 5 - (dimethylaminomethyl)benzylthio]diethyl ether | 2 |
| 1,4 - bis[3-t-butyl - 4 - hydroxy - 5 - (dimethylaminomethyl)benzylthio]butane | 4 |

Samples of the bulk polymer containing these stabilizers did not develop color after heat aging thereby demonstrating the excellent non-discoloring characteristics of the compounds of this invention.

EXAMPLE 13

This example demonstrates the usefulness of the compounds of this invention as stabilizers for an ethylene-propylene terpolymer.

A hexane solution of a commercial ethylene-propylene-dicyclopentadiene terpolymer containing no stabilizer was used as the base polymer. The compounds were evaluated using the carbonyl development test described in example 12. The aging temperature was 150° C.

| Added stabilizer: | Hours to break |
|---|---|
| None | 2 |
| α,α'-bis[3 - cyclohexyl - 4 - hydroxy-5-(dimethylaminomethyl)benzylthio] - p - xylene | 5 |
| 1,4 - bis[3-t-butyl - 4 - hydroxy - 5 - (dimethylaminomethyl)benzylthio]butane | 5 |
| 1,4 - bis[3-methyl - 4 - hydroxy - 5 - (dimethylaminomethyl)benzylthio]butane | 5 |
| α,α'-bis[3-methyl - 4 - hydroxy - 5 - (dimethylaminomethyl)benzylthio] - p - xylene | 5 |
| β,β'-bis[2,5 - dimethyl - 3 - (dimethylaminomethyl)-4-hydroxybenzylthio]diethyl ether | 6 |
| β,β' - bis[2,5 - dimethyl - 3 - (dimethylaminomethyl) - 4 - hydroxybenzylthio]diethyl sulfide | 6 |
| β,β'-bis[3-t-butyl - 4 - hydroxy - 5 - (dimethylaminomethyl)benzylthio]diethyl ether | 7 |
| 1,2 - bis[3-t-butyl - 4 - hydroxy - 5 - (dimethylaminomethyl)benzylthio]ethane | 8 |
| 1,2 - bis[3 - methyl - 4 - hydroxy - 5 - (dimethylaminomethyl)benzylthio]ethane | 12 |
| 1,2-bis[3 - cyclohexyl - 4 - hydroxy-5-(dimethylaminomethyl)benzylthio]ethane | -- |

Having thus described my invention, what I claim and desire to protect by Letters Patent is:

1. A chemical of the formula:

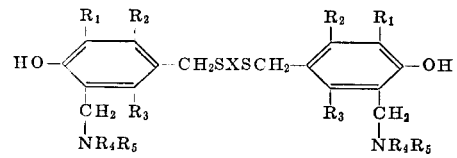

wherein $R_1$ is selected from the group consisting of an alkyl group of up to 12 carbon atoms, a cycloalkyl group of from 5 to 8 carbon atoms and an aralkyl group of from 7 to 9 carbon atoms, wherein $R_2$ and $R_3$ are selected from the group consisting of hydrogen or methyl, wherein $R_4$ and $R_5$ are alkyl groups of up to 5 carbon atoms each, and wherein X is a diradical containing from about 2 to about 14 carbon atoms and is selected from the group consisting of:

polymethylene diradicals of the formula $$—(CH_2)_n—$$

wherein $n$ is a whole number from 2 to 14;

Branched chain polyalkylene diradicals of the formula:

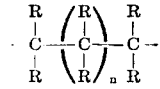

wherein $n$ is a whole number from 0 to 11 and the R groups may be hydrogen or alkyl groups and at least one of the R groups is an alkyl group; aralkyl diradicals of the formula:

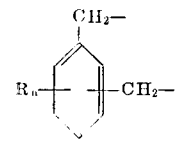

wherein R is an alkyl group and $n$ is a whole number from 0 to 4;
aralkyl diradicals of the formula:

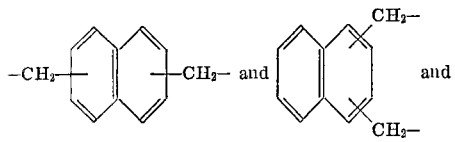

aromatic diradicals of the formula:

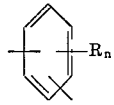

wherein R is an alkyl radical and $n$ is a whole number from 0 to 4;
aromatic diradicals of the formula:

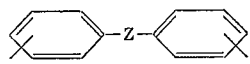

wherein Z is selected from the group consisting of —O—, —S— and —$SO_2$—
an aromatic diradical of the formula:

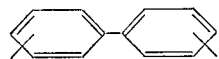

cyclic hydrocarbon containing diradicals of the general formula:

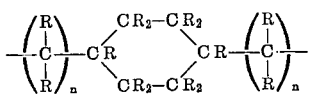

wherein the R groups may be hydrogen or alkyl groups and $n$ is a whole number from 0 to 6;
aliphatic diradicals containing hetero atoms of the general formula:

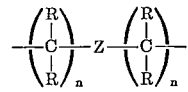

wherein the R groups may be hydrogen or alkyl groups, $n$ is a whole number from 1 to 6 and X is selected from the group consisting of —O—, —S—, —$SO_2$— and —NR'— (wherein R' is an alkyl group);
diradicals of the formulae:

—$CH_2CH_2OCH_2CH_2OCH_2CH_2$—
and
—$CH_2CH_2OCH_2OCH_2CH_2$—

2. The compound of claim 1 wherein $R_1$ is methyl, $R_2$ and $R_3$ are hydrogen, $R_4$ and $R_5$ are methyl and X is —$CH_2CH_2OCH_2CH_2$—.

3. The compound of claim 1 wherein $R_1$ is methyl, $R_2$ is hydrogen, $R_3$, $R_4$ and $R_5$ are methyl and X is

—$CH_2CH_2OCH_2CH_2$—

References Cited
UNITED STATES PATENTS

| | | | |
|---|---|---|---|
| 3,219,700 | 11/1965 | O'Shea et al. | 260—569 |
| 3,299,147 | 1/1967 | O'Shea | 260—570.5 X |
| 3,310,587 | 3/1967 | O'Shea | 260—570.5 X |
| 3,489,804 | 1/1970 | O'Shea | 260—570.5 X |

ROBERT V. HINES, Primary Examiner

U.S. Cl. X.R.

252—402; 260—45.9 R, 398.5, 570 R, 570.5 PA, 809

UNITED STATES PATENT OFFICE
CERTIFICATE OF CORRECTION

Patent No. 3631109      Dated     December 28, 1971

Inventor(s)    Francis X. O'Shea

It is certified that error appears in the above-identified patent and that said Letters Patent are hereby corrected as shown below:

In Claim 1, cancel from Column 8, line 54 through Column 10, line 2; and from Column 10, line 14 through line 17; in Column 10, line 11, change "X" to --Z--.

Signed and sealed this 26th day of September 1972.

(SEAL)
Attest:

EDWARD M. FLETCHER, JR.              ROBERT GOTTSCHALK
Attesting Officer                     Commissioner of Patents